United States Patent
Kobayashi

(10) Patent No.: US 11,829,603 B2
(45) Date of Patent: Nov. 28, 2023

(54) INFORMATION PROCESSING SYSTEM AND IMAGE FORMING APPARATUS CAPABLE OF ACCURATELY PREDICTING LIFETIME OF SEMICONDUCTOR DEVICE, AND CONTROL METHOD THEREFOR

(71) Applicant: CANON KABUSHIKI KAISHA, Tokyo (JP)

(72) Inventor: Yo Kobayashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/326,484

(22) Filed: May 21, 2021

(65) Prior Publication Data

US 2021/0382630 A1  Dec. 9, 2021

(30) Foreign Application Priority Data

Jun. 5, 2020 (JP) ................................ 2020-098846

(51) Int. Cl.
*G06F 3/06* (2006.01)

(52) U.S. Cl.
CPC .......... *G06F 3/0616* (2013.01); *G06F 3/0649* (2013.01); *G06F 3/0658* (2013.01); *G06F 3/0679* (2013.01)

(58) Field of Classification Search
CPC .... G06F 3/0616; G06F 3/0649; G06F 3/0658; G06F 3/0679
USPC ........................................................ 711/154
See application file for complete search history.

(56) References Cited

U.S. PATENT DOCUMENTS

| 10,178,265 | B2 | 1/2019 | Sakuma | |
|---|---|---|---|---|
| 2005/0235284 | A1* | 10/2005 | Kadashevich | G06F 11/3419 718/100 |
| 2009/0313444 | A1* | 12/2009 | Nakamura | G06F 11/008 711/159 |
| 2012/0137087 | A1* | 5/2012 | Umimura | G06F 3/0631 711/E12.001 |
| 2017/0147238 | A1* | 5/2017 | Dumov | G06F 12/0246 |
| 2017/0228161 | A1* | 8/2017 | Nangoh | G06F 3/0604 |
| 2018/0039213 | A1* | 2/2018 | Endoh | G03G 15/5062 |
| 2020/0159459 | A1* | 5/2020 | Tu | G06F 3/0658 |

FOREIGN PATENT DOCUMENTS

JP  2015198377 A  11/2015

* cited by examiner

*Primary Examiner* — Gautam Sain
(74) *Attorney, Agent, or Firm* — ROSSI, KIMMS & McDOWELL LLP

(57) ABSTRACT

An information processing system that is capable of accurately predicting a lifetime of a semiconductor device that carries out communications related to reading and writing of data from and to a storage device. The information processing system has an image forming apparatus having a nonvolatile memory and a first controller that controls reading and writing of data from and to the nonvolatile memory. The information processing system also has a server that monitors a lifetime of the first controller. The server has a receiving I/F that receives information indicating a communication data size of reading and writing of data from and to the nonvolatile memory, and a second controller that predicts the lifetime of the first controller based on the received information indicating the communication data size.

21 Claims, 13 Drawing Sheets

(a) WAVEFORM OF CLOCK SIGNAL A (WHEN CLOCK GATING CONTROL IS DISABLED)

(b) WAVEFORM OF CLOCK SIGNAL A (WHEN CLOCK GATING CONTROL IS ENABLED)

FIG. 8

| | | |
|---|---|---|
| PRODUCT SERIAL NUMBER | XXX-YYY-01 | XXX-YYY-02 |
| RECEPTION DATE AND TIME | 2020/04/01 09:00 | 2020/04/03 12:00 |
| TOTAL READ DATA SIZE (GByte) | 0.5 (GByte) | 0.1 (GByte) |
| TOTAL WRITTEN DATA SIZE (GByte) | 0.3 (GByte) | 0.2 (GByte) |
| TOTAL CUMULATIVE COMMUNICATION DATA SIZE (GByte) | 0.8 (GByte) | 0.3 (GByte) |
| NOTIFICATION SENDING DATE AND TIME | 2020/04/01 09:01 | 2020/04/03 12:01 |

INFORMATION PROCESSING SYSTEM AND IMAGE FORMING APPARATUS CAPABLE OF ACCURATELY PREDICTING LIFETIME OF SEMICONDUCTOR DEVICE, AND CONTROL METHOD THEREFOR

BACKGROUND OF THE INVENTION

Field of the Invention

The present invention relates to an information processing system, an image forming apparatus, and a control method therefor.

Description of the Related Art

An image forming apparatus equipped with a semiconductor device such as a CPU (Central Processing Unit) is known (see, for example, Japanese Laid-Open Patent Publication (Kokai) No. 2015-198377). As semiconductor manufacturing processes have been becoming sophisticated, high integration and high speed communication have become possible while durability of semiconductor devices has been decreasing. For example, the greater the number of accesses to a storage device is, the higher is the likelihood that an interface unit of the CPU, which carries out communications related to writing and reading of data to and from a storage device, is broken. Semiconductor devices have their lifetime, and thus when a semiconductor device has come close to the end of its life, electronic components including this semiconductor device need to be replaced. There is a strong demand for a technique for accurately predicting the lifetime of a semiconductor device so that it can be replaced without delay, before it is broken. For example, predicting the lifetime of a semiconductor device based on a size of data written from the semiconductor device is under consideration.

However, with information on only a data size of written data, it is impossible to accurately predict the lifetime of a CPU that carries out communications related to reading and writing of data from and to a storage device.

SUMMARY OF THE INVENTION

The present invention provides an information processing system and an image forming apparatus that are capable of accurately predicting the lifetime a CPU, which carries out communications related to reading and writing of data from and to a storage device, and a control method therefor.

Accordingly, the present invention provides an information processing system comprising an image forming apparatus having a nonvolatile memory and a first controller that controls reading and writing of data from and to the nonvolatile memory, and a server configured to monitor a lifetime of the first controller in the image forming apparatus, wherein the sever comprises a receiving I/F configured to receive information indicating a communication data size of reading and writing of data from and to the nonvolatile memory, and a second controller configured to predict a lifetime of the first controller based on the received information indicating the communication data size.

According to the present invention, the lifetime of a semiconductor device that carries out communications related to reading and writing of data from and to a storage device is accurately predicted.

Further features of the present invention will become apparent from the following description of exemplary embodiments (with reference to the attached drawings).

BRIEF DESCRIPTION OF THE DRAWINGS

FIG. 8 is a view showing an example of an operating rate management file that is stored in a storage device in FIG. 4.

DESCRIPTION OF THE EMBODIMENTS

The present invention will now be described in detail below with reference to the accompanying drawings showing embodiments thereof.

A description will now be given of an information processing system according to a first embodiment of the present invention.

Figure 1:
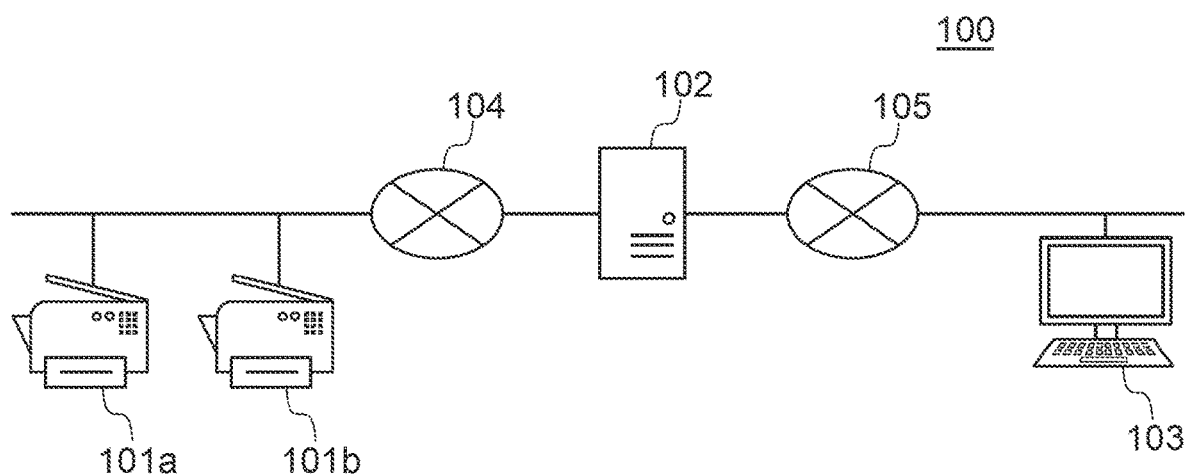
FIG. 1 is a view schematically showing an arrangement of an information processing system according to a first embodiment of the present invention.

FIG. 1 is a view schematically showing an arrangement of the information processing system 100 according to the first embodiment of the present invention. Referring to FIG. 1, the information processing system 100 has an image forming apparatus 101a, an image forming apparatus 101b, a server 102, and a communication terminal 103. It should be noted that in the present embodiment, the arrangement of the information processing system 100 is just one example, and the information processing system 100 has only to be have one or more image forming apparatuses. The information processing system 100 may also have a plurality of communication terminals. The server 102 is connected to the image forming apparatus 101a and the image forming apparatus 101b via a network 104, and also connected to the communication terminal 103 via a network 105. It should be noted that in the present embodiment, the image forming apparatus 101a and the image forming apparatus 101b have the same functions and arrangement, and hence the functions and arrangement of only the image forming apparatus 101a will be described by way of example.

The image forming apparatus 101a is an MFP (Multi Functional Peripheral) equipped with a plurality of functions such as a copying function, a scanning function, a faxing function, and a communicating function. The image forming apparatus 101a receives, for example, print job data, which is sent from an external apparatus, via the server 102. The image forming apparatus 101a generates image data by scanning in an original and uploads the image data to the server 102. The network 104 and the network 105 are a WAN (Wide Area Network) and/or a LAN (Local Area Network). In the network 104 and the network 105, for example, TCP/IP (Transmission Control Protocol/Internet Protocol) is used as a communication protocol.

The server 102 is, for example, a cloud server. The server 102 manages information about the image forming apparatus 101a and the image forming apparatus 101b. The server 102 monitors the lifetime of each electronic component in the image forming apparatus 101a and the image forming apparatus 101b. For example, the server 102 predicts the lifetime of an electronic component which the image forming apparatus 101a has based on information received from the image forming apparatus 101a, and upon predicting that the electronic component will soon reach its end of life, the server 102 notifies the communication terminal 103 of this prediction.

The communication terminal 103 is a communication apparatus, which is capable of communicating with the server 102, such as a PC (Personal Computer), a smartphone, or a tablet terminal. The communication terminal 103 is operated by a serviceperson or operator who remotely monitors the operating status of the image forming apparatus 101a and the image forming apparatus 101b.

Figure 2:
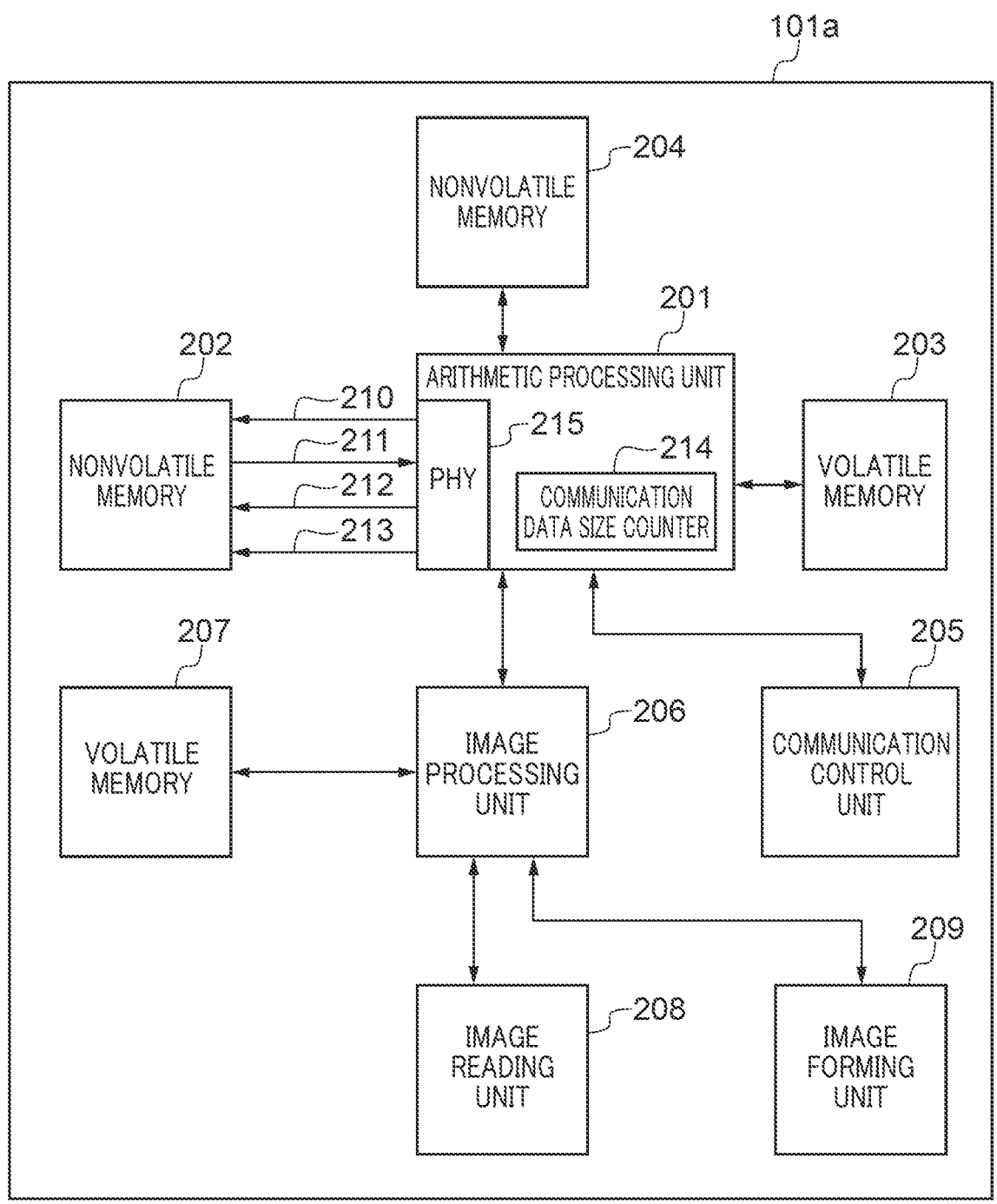
FIG. 2 is a block diagram schematically showing a hardware arrangement of an image forming apparatus in FIG. 1.

FIG. 2 is a block diagram schematically showing a hardware arrangement of the image forming apparatus 101a in FIG. 1. Referring to FIG. 2, the image forming apparatus 101a has an arithmetic processing unit 201, a nonvolatile memory 202, a volatile memory 203, a nonvolatile memory 204, a communication control unit 205, an image processing unit 206, a volatile memory 207, an image reading unit 208, and an image forming unit 209.

The arithmetic processing unit 201 is a semiconductor device and more specifically, a CPU. The arithmetic processing unit 201 includes a communication data size counter 214 and a PHY (Physical Layer) 215. The arithmetic processing unit 201 loads programs stored in the nonvolatile memory 202 to the volatile memory 203 and successively executes the programs in response to operation of a program counter (not shown) which the arithmetic processing unit 201 has.

The nonvolatile memory 202 is a storage device capable of holding data even when the supply of power is stopped and is, for example, an eMMC (embedded Multi Media Card). The nonvolatile memory 202 stores programs. The programs are those which control the entire system of the image forming apparatus 101a such as a program or boot loader for starting an OS (Operating System). The nonvolatile memory 202 is connected to the PHY 215 of the arithmetic processing unit 201 via buses 210 to 213. The bus 210 is for transferring a clock signal A generated by the arithmetic processing unit 201 to the nonvolatile memory 202. The bus 211 is for transferring a clock signal B generated by the nonvolatile memory 202 to the arithmetic processing unit 201. The bus 212 is for transferring a command signal. The bus 213 is for transferring a data signal.

The clock signal A is output from the arithmetic processing unit 201, which is a host, to the nonvolatile memory 202. In the image forming apparatus 101a, the clock signal A is usually used as a reference clock at the time of communication. The eMMC standard which the nonvolatile memory 202 is compliant with supports a plurality of communication modes. To carry out a communication between the arithmetic processing unit 201 and the nonvolatile memory 202 in a communication mode named HS400, a reference clock used for sampling of data output from the nonvolatile memory 202, which is a device, performed by the arithmetic processing unit 201, which is the host, needs to be output from the nonvolatile memory 202. A clock signal that is used in this case is the clock signal B. Also, the arithmetic processing unit 201 sends the command signal, which is an instruction for reading, writing, or the like, and the data signal including data corresponding to the instruction, to the nonvolatile memory 202.

Data is read from and written to the nonvolatile memory 202 on a block-by-block basis, and a data size per block is managed by a file system (not shown) of the image forming apparatus 101a. The data size per block is, for example, about 512 bytes. In the present embodiment, the communication data size counter 214 of the arithmetic processing unit 201 counts the number of reading/writing operations that have been performed while the image forming apparatus 101a is energized, on a block-by-block basis. A result of counting by the communication data size counter 214 is held by the nonvolatile memory 202. For example, the communication data size counter 214 obtains a count of ten as the number of reading operations performed for one block at a time, two as the number of writing operations performed for one block at a time, a count of five as the number of reading operations performed for two blocks at a time, a count of one as the number of writing operations performed for two blocks at a time, a count of three as the number of reading operations performed for four blocks at a time, a count of two as the number of writing operations performed for four blocks at a time.

A predetermined operating rate is determined in advance for the PHY 215, and when the operating rate of the PHY 215 becomes greater than the predetermined operating rate, it becomes impossible for the PHY 215 to operate normally. The operating rate is a rate at which the PHY 215 is allowed to operate per unit time. In the present embodiment, an operating rate of 80% for the clock signal A is determined as the predetermined operating rate. For example, in the image forming apparatus 101a configured to operate for five years, when a cumulative total of hours for which the arithmetic processing unit 201 has output the clock signal A is longer than four years, there is a very high possibility that the PHY 215 will fail. To prevent a failure of the PHY 215, the arithmetic processing unit 201 performs clock gating control on the clock signal A that is output to the nonvolatile memory 202. In the clock gating control, control is performed to stop generating the clock signal A during a time period during which neither the command signal nor the data signal is communicated, that is, a time period during which no data is read or written. Operations in the clock gating control will be described later.

The volatile memory 203 is a DRAM. The volatile memory 203 is used as an area to which the programs stored in the nonvolatile memory 202 are loaded. The volatile memory 203 is used as a work memory for the arithmetic processing unit 201 and as a temporary storage area where arithmetic processing data is temporarily stored. The nonvolatile memory 204 is a storage device that is used for a different purpose from that of the nonvolatile memory 202 and, for example, stores identification information about the image forming apparatus 101a such as a product serial number uniquely assigned to the image forming apparatus 101a.

The communication control unit 205 carries out communications via the network 104 with the server 102, which is connected to the image forming apparatus 101a, according to the communication protocol TCP/IP. In the present embodiment, it is assumed that the image forming apparatus 101a is connected to the server 102 via an Ethernet cable. The image forming apparatus 101a is also capable of being peer-to-peer connected to an information processing apparatus such as a PC via the Ethernet cable, and the communication control unit 205 outputs PDL (Page Description Language) data received from the information processing apparatus to the arithmetic processing unit 201.

The image processing unit 206 performs, for example, image processing on image data received from the image reading unit 208, image processing on image data to be output to the image forming unit 209, or the like. Examples of the image processing include a packetization process, a compression process, a rotation process, and a halftoning process. The image processing unit 206 also has an arithmetic processing unit (not shown) and uses the volatile memory 207 as a work memory when performing image processing.

The image reading unit 208 has a contact image sensor (not shown), which converts characters and images on sheets to electronic data, and functions as an input unit in copying and scanning that are basic functions of the image forming apparatus 101a. The image forming unit 209 is an output unit that is used in copying and printing and forms an image on a sheet using a photosensitive body (not shown), toner (not shown), a fixing unit (not shown), and so forth provided in the image forming apparatus 101a.

A description will now be given of the clock gating control that is performed on the clock signal A to be output to the nonvolatile memory 202 by the arithmetic processing unit 201.

The clock gating control is a control intended mainly to reduce power consumption of a semiconductor device. A CPU, which is a semiconductor device, generally keeps outputting a clock signal while the power is on. The CPU, however, does not keep sending or receiving the command signal or data signal while outputting the clock signal. In the clock gating control, when it is detected that sending or receiving the command signal or data signal is not performed, the CPU outputting the clock signal stops generation of the clock signal is stopped, whereby the power consumption of the CPU is reduced. In recent years when semiconductor devices have been increasingly finer, the clock gating control is useful in not only reducing power consumption but also delaying the time when a PHY of the CPU fails.

In the present embodiment, the clock gating control function is enabled when predetermined setting values are set in a register (not shown) of the arithmetic processing unit 201 through a software module such as a BIOS (Basic Input Output System) or OS.

Figure 3:
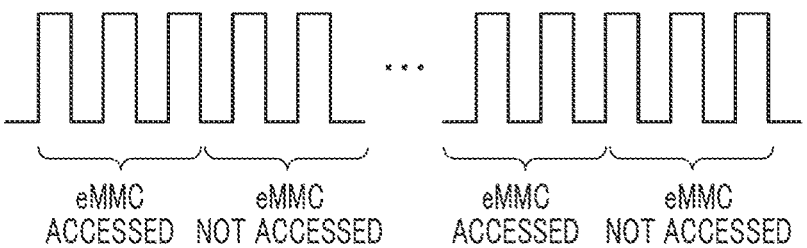
FIG. 3 is a conceptual view useful in explaining clock gating control by an arithmetic processing unit in FIG. 2.
Figure 3:
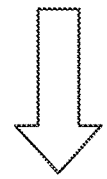
Figure 3:
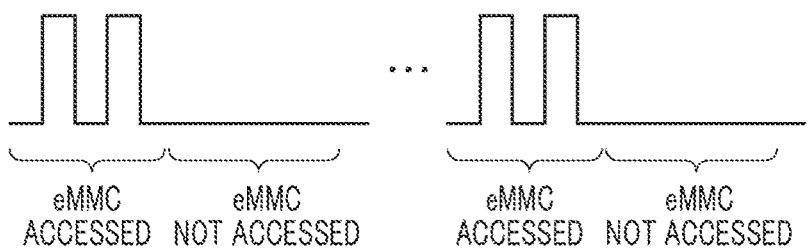

FIG. 3 is a conceptual view useful in explaining the clock gating control performed by the arithmetic processing unit 201 in FIG. 2. When the clock gating control function is disabled, the arithmetic processing unit 201 continues outputting the clock signal A while the power is supplied to the arithmetic processing unit 201, irrespective of whether or not there is an access to the nonvolatile memory 202 such as reading or writing (see, for example, (a) in FIG. 3). On the other hand, when the clock gating control function is enabled, the arithmetic processing unit 201 outputs the clock signal A only during a time period during which there is the access to the nonvolatile memory 202, and the arithmetic processing unit 201 does not generate the clock signal A during a time period during which there is not the access to the nonvolatile memory 202 (see, for example, (b) in FIG. 3). The time period during which there is the access to the nonvolatile memory 202 means a time period from the start to completion of reading from or writing to the nonvolatile memory 202, and the time period during which the clock signal A is output increases in proportion to the size of data to be read or written. Thus, in the clock gating control, the operating rate of the clock signal A depends on the size of data that is read from or written to the nonvolatile memory 202 by the arithmetic processing unit 201.

In the present embodiment, in the clock gating control, attention is focused on that the operating rate of the clock signal A is proportional to the size of data that is read from or written to the nonvolatile memory 202 by the arithmetic processing unit 201, and based on this information, the lifetime of the PHY 215 is predicted.

For example, in a case where the arithmetic processing unit 201 has continued outputting the clock signal A at a frequency of 200 MHz for five years, about $3.2 \times 10^{16}$ clocks are output in theory. This means that data with a data size of about $4.0 \times 10^{15}$ bytes (hereafter referred to as "the maximum data size") can be read from and written to the nonvolatile memory 202. In the present embodiment, since there is an upper limit of 80% to the operating rate of the clock signal A, a total cumulative data size of data to be read from or written to the nonvolatile memory 202 needs to fall within a data size of about $3.2 \times 10^{15}$ bytes (hereafter referred to as "the communication limit data size") corresponding to 80% of the maximum data size. In the present embodiment, a total cumulative size of data to be read from and written to the nonvolatile memory 202 is controlled to fall within a data size (hereafter referred to as "the failure prediction threshold value") that is determined in consideration of a predetermined margin allowed for the communication limit data size. The failure prediction threshold value is a value that corresponds to 90% of the communication limit data size. When the operating rate of the clock signal A exceeds the failure prediction threshold value, the server 102 determines that the PHY 215 is nearing the end of its life, carries out the process in step S604 to be described later, and notifies the communication terminal 103 to that effect.

Figure 4:
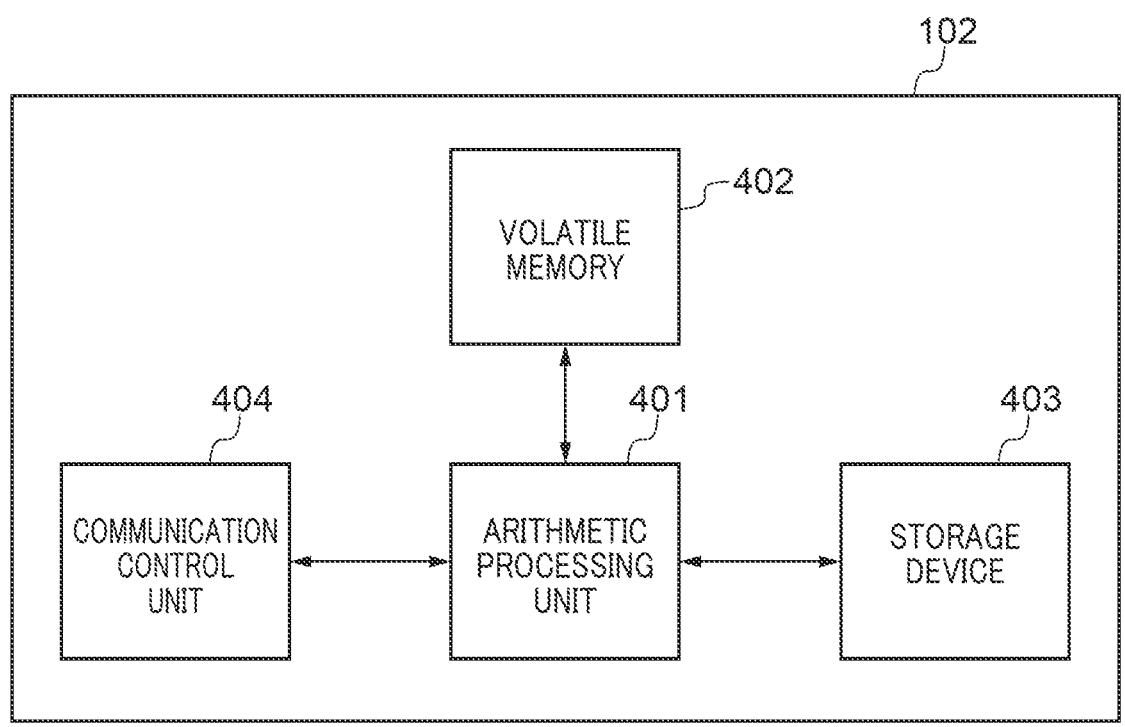
FIG. 4 is a block diagram schematically showing a hardware arrangement of a server in FIG. 1.

FIG. 4 is a block diagram schematically showing a hardware arrangement of the server 102 in FIG. 1. Referring to FIG. 4, the server 102 has an arithmetic processing unit 401, a volatile memory 402, a storage device 403, and a communication control unit 404. The arithmetic processing unit 401 is connected to the volatile memory 402, the storage device 403, and the communication control unit 404.

At the time of system startup, in the server 102, the arithmetic processing unit 401 loads programs stored in the storage device 403 to the volatile memory 402. The arithmetic processing unit 401 executes the loaded programs to perform various types of control. For example, the arithmetic processing unit 401 performs arithmetic operations regarding various types of data received via the network 104 and the network 105.

The storage device 403 is a nonvolatile memory with a relatively large capacity such as an HDD (Hard Disk Drive) or SSD (Solid State Drive). It should be noted that in the present embodiment, the server 102 needs to store an enormous amount of data and thus may be configured to be equipped with a plurality of storage devices 403.

The communication control unit 404 is connected to the image forming apparatus 101a, the image forming apparatus 101b, and the communication terminal 103 via Ethernet cables. It should be noted that in the present embodiment, the server 102 may be equipped with only one physical interface (connector) (not shown), to which an Ethernet cable is connected, and be logically split into a plurality of networks by a virtual LAN. The server 102 may be configured to be equipped with a plurality of physical interfaces (I/Fs), to which Ethernet cables are connected, and a plurality of communication control units for the respective interfaces.

Figure 5:
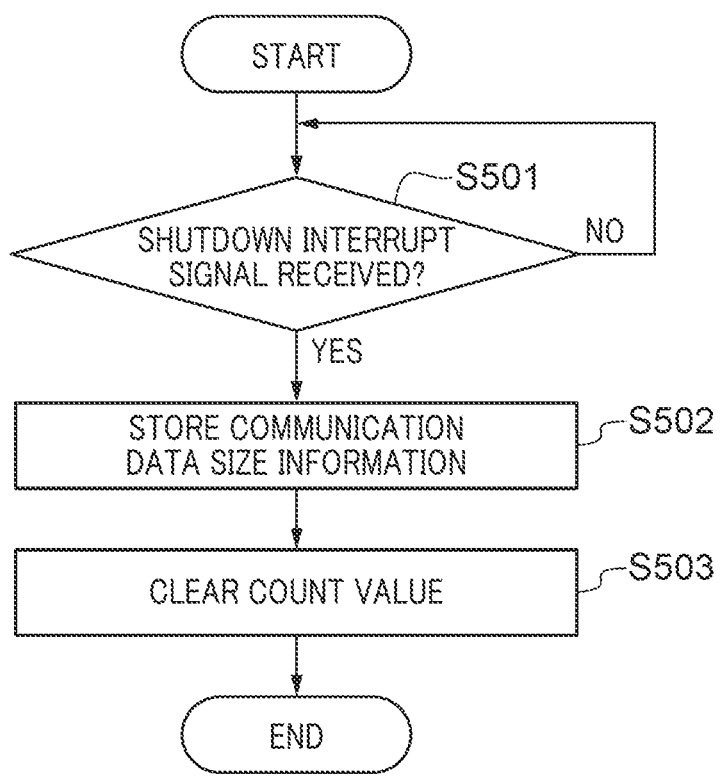
FIG. 5 is a flowchart showing the procedure of a communication data size information storage process that is carried out by the image forming apparatus in FIG. 1.

FIG. 5 is a flowchart showing the procedure of a communication data size information storage process that is carried out by the image forming apparatus 101a in FIG. 1. The process in FIG. 5 is implemented by the arithmetic processing unit 201 executing a program loaded from the nonvolatile memory 202 to the volatile memory 203. The process in FIG. 5 is carried out when the arithmetic processing unit 201 has received a shutdown interrupt signal. The shutdown interrupt signal is an interrupt signal output to the arithmetic processing unit 201 from a circuit of the image forming apparatus 101a, which has detected an event indicating issuance of a shutdown instruction, for example, a depression of a power switch of the image forming apparatus 101a by the user.

Referring to FIG. 5, the arithmetic processing unit 201 stands by until it receives the shutdown interrupt signal (step S501). Upon receiving the shutdown interrupt signal (YES in the step S501), the arithmetic processing unit 201 stores communication data size information in the nonvolatile memory 202 (step S502). The communication data size information includes the number of reads and writes for each block, which is counted by the communication data size counter 214 during a time period from the start of the power supply to the image forming apparatus 101a to receipt of the shutdown interrupt signal by the arithmetic processing unit 201 in the step S501, and a data size per block. Then, the arithmetic processing unit 201 causes the communication data size counter 214 to stop counting, clears a count value indicating a result of counting by the communication data size counter 214 (step S503), carries out a shutdown process for the image forming apparatus 101a to end the communication data size information storage process.

As described above, in the present embodiment, the communication data size information including the information about the size of data read from and written to the nonvolatile memory 202 by the arithmetic processing unit 201 during a time period from startup to shutdown of the image forming apparatus 101a is held. In the following description, this communication data size information is referred to as "the communication data size information during the previous operation".

Figure 6:
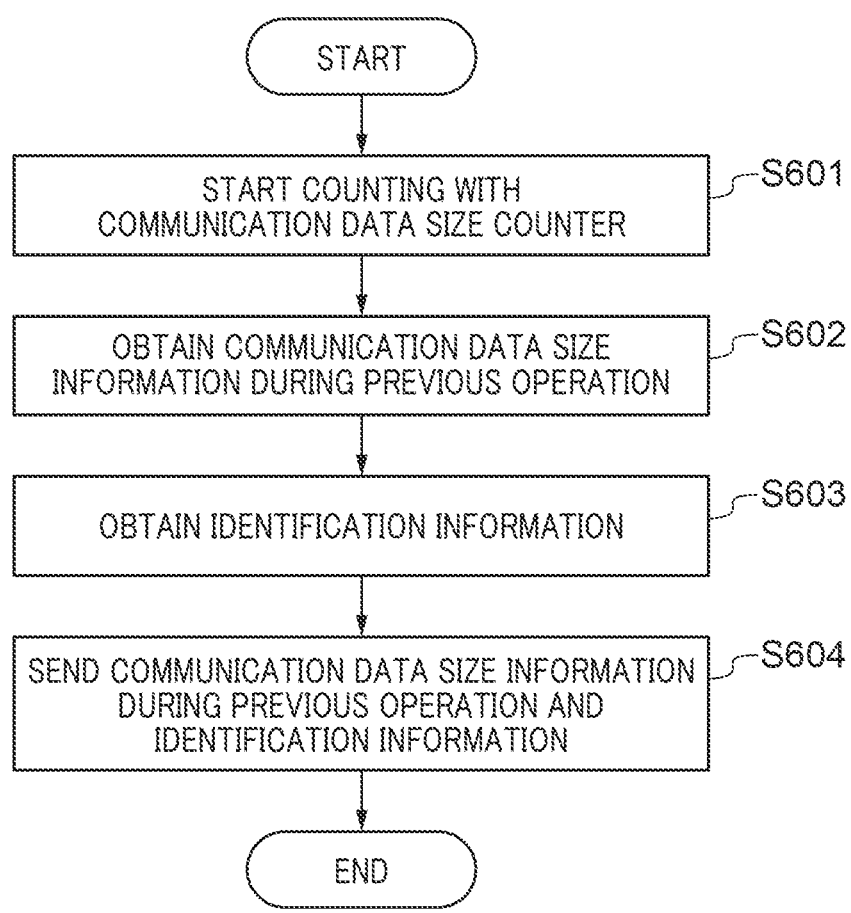
FIG. 6 is a flowchart showing the procedure of a communication data size information sending process that is carried out by the image forming apparatus in FIG. 1.

FIG. 6 is a flowchart showing the procedure of a communication data size information sending process that is carried out by the image forming apparatus 101a in FIG. 1. The process in FIG. 6 is implemented by the arithmetic processing unit 201 executing a program loaded from the nonvolatile memory 202 to the volatile memory 203. The process in FIG. 6 is carried out when the power is started to be supplied to the arithmetic processing unit 201 and the arithmetic processing unit 201 ended an initialization process for an eMNC driver (not shown), which controls the nonvolatile memory 202, and an initialization process for the file system (not shown).

Referring to FIG. 6, the arithmetic processing unit 201 causes the communication data size counter 214 to start counting (step S601). Next, the arithmetic processing unit 201 obtains the communication data size information during the previous operation, which was stored in the step S502 described above, from the nonvolatile memory 202 (step S602). Then, the arithmetic processing unit 201 obtains identification information about the image forming apparatus 101a from the nonvolatile memory 204 (step S603). After that, the arithmetic processing unit 201 causes the communication control unit 205 to send the communication data size information during the previous operation and the identification information about the image forming apparatus 101a to the server 102 (step S604), and ends the communication data size information sending process.

Figure 7:
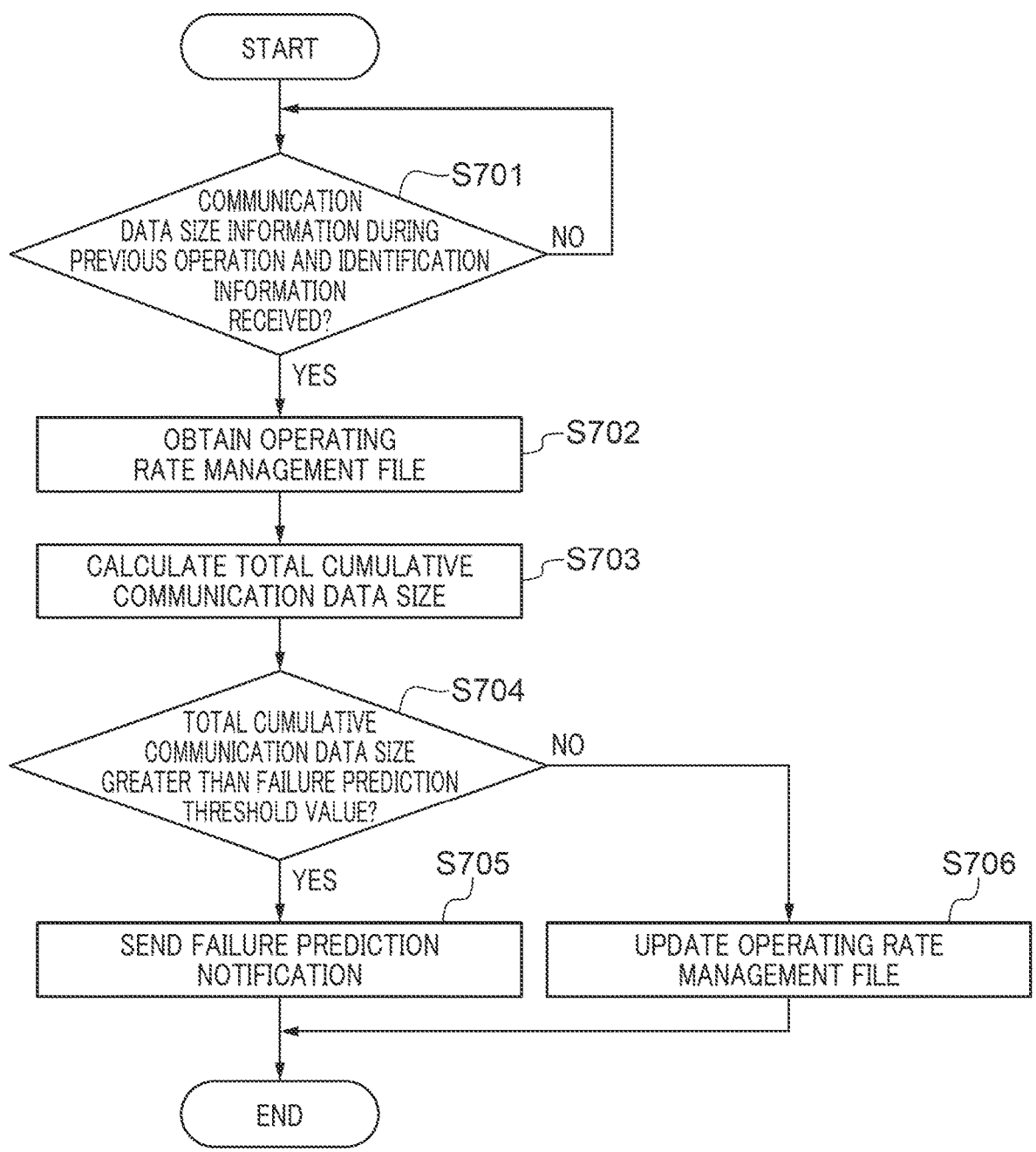
FIG. 7 is a flowchart showing the procedure of a lifetime prediction process that is carried out by a server in FIG. 1.

FIG. 7 is a flowchart showing the procedure of a lifetime prediction process that is carried out by the server 102 in FIG. 1. The process in FIG. 7 is implemented by the arithmetic processing unit 401 of the server 102 executing a program loaded from the storage device 403 to the volatile memory 402. It is assumed that in the process in FIG. 7, an operating rate management file 800 in FIG. 8, to be described later, is stored beforehand in the storage device 403.

Referring to FIG. 7, first, the arithmetic processing unit 401 stands by until it receives the communication data size information during the previous operation and the identification information from the image forming apparatus 101a or the image forming apparatus 101b (step S701). For example, upon receiving the communication data size information during the previous operation and the identification information about the image forming apparatus 101a from the image forming apparatus 101a (YES in the step S701), the arithmetic processing unit 401 obtains the operating rate management file 800 from the storage device 403 (step S702).

The operating rate management file 800 is a file for managing information about a plurality of image forming apparatuses connected to the server 102, such as the image forming apparatus 101a and the image forming apparatus 101a.

The operating rate management file 800 includes a product serial number 801, a reception date and time 802, a total read data size 803, a total written data size 804, a total cumulative communication data size 805, and a notification sending date and time 806. Identification information received from, for example, the image forming apparatus 101a by the server 102 is set as the product serial number 801. A date and time at which the server 102 received the communication data size information during the previous operation and the identification information from, for example, the image forming apparatus 101a, is set as the reception date and time 802. A total read data size calculated using the number of reads per block and a data size (for example, 512 [Bytes]) of each block included in the communication data size information during the previous operation received from, for example, the image forming apparatus 101a by the server 102 is set as the total read data size 803.

A total written data size calculated by using the number of writes per block and a data size (for example, 512 [Bytes]) of each block included in the communication data size information during the previous operation received from, for example, the image forming apparatus 101a by the server 102 is set as the total written data size 804. A communication data size obtained by adding a value of the total read data size 803 and the total written data size 804 in, for example, the image forming apparatus 101a together is set as the total cumulative communication data size 805. A date and time at which a notification was provided to the communication terminal 103 when the total cumulative communication data size 805 became greater than the failure prediction threshold value is set as the notification sending date and time 806. Information about sizes of communication data of reading and writing of data from and to nonvolatile memory (eMMC) by arithmetic processing units in all of image forming apparatuses monitored by the server 102 is managed in the operating rate management file 800.

Then, the arithmetic processing unit 401 calculates a total cumulative communication data size (step S703). Specifically, the arithmetic processing unit 401 obtains a value of the total cumulative communication data size 805 from the operating rate management file 800 and adds a communication data size, which is calculated based on the communication data size information during the previous operation obtained in the step S701, to the obtained value of the total cumulative communication data size 805. The arithmetic processing unit 401 also obtains a value of the total read data size 803 from the operating rate management file 800 and adds a total read data size, which is calculated based on the communication data size information during the previous operation obtained in the step S701, to the obtained value of the total read data size 803. Further, the arithmetic processing unit 401 obtains a value of the total written data size 804 from the operating rate management file 800 and adds a total written data size, which is calculated based on the communication data size information during the previous operation obtained in the step S701, to the obtained value of the total written data size 804. Then, the arithmetic processing unit 401 determines whether or not the total cumulative communication data size calculated in the step S703 is greater than the failure prediction threshold value (step S704). The failure prediction threshold value is a value corresponding to 90% of the communication limit data size as described above.

As a result of the determination in the step S704, when the total cumulative communication data size calculated in the step S703 is greater than the failure prediction threshold value, the arithmetic processing unit 401 controls the communication control unit 404 to send a failure prediction notification to the communication terminal 103 (step S705). The failure prediction notification includes the identification information received in the step S701 and the total cumulative communication data size, the total read data size, and the total written data size calculated in the step S703. After that, the lifetime prediction process is ended. The failure prediction notification enables a serviceperson or operator, who is operating the communication terminal 103 and remotely monitoring the image forming apparatus 101a, to know that the arithmetic processing unit 201 of the image forming apparatus 101a is nearing the end of its life, and replace a module including the arithmetic processing unit 201, for example, a printed circuit board on which the arithmetic processing unit 201 is mounted with a new printed circuit board before the arithmetic processing unit 201 fails. When the replacement of the printed circuit board is completed, a circuit board replacement completion notification including the identification information about the image forming apparatus 101a is sent from the communication terminal 103 to the server 102.

As a result of the determination in the step S704, when the total cumulative communication data size calculated in the step S703 is not greater than the failure prediction threshold value, the arithmetic processing unit 401 updates the operating rate management file 800 (step S706). Specifically, the arithmetic processing unit 401 writes the cumulative communication data size, the total read data size, and the total written data size calculated in the step S701 over corresponding items in the operating rate management file 800. After that, the lifetime prediction process is ended.

Figure 9:
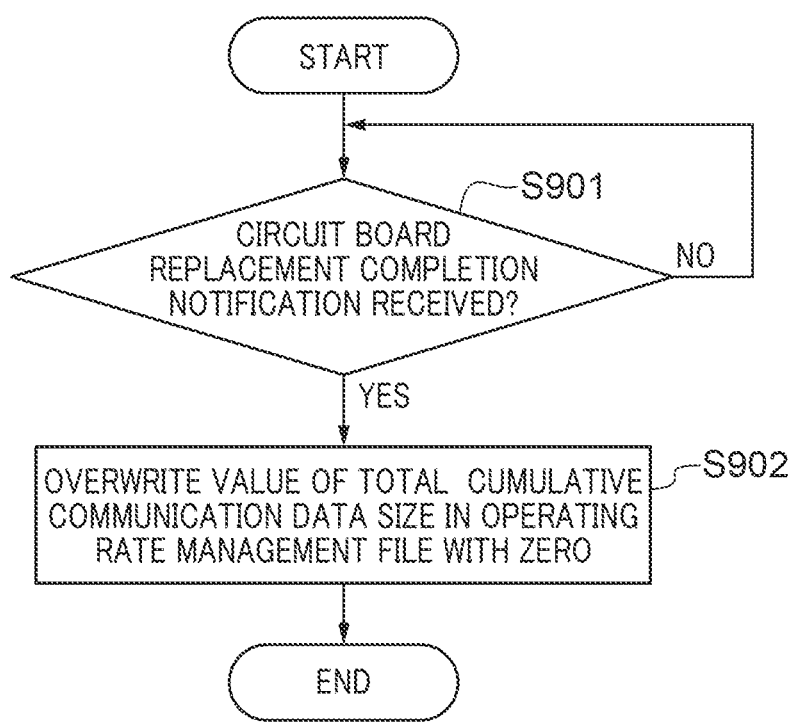
FIG. 9 is a flowchart showing the procedure of a data size reset process that is carried out by the server in FIG. 1.

FIG. 9 is a flowchart showing the procedure of a data size reset process that is carried out by the server 102 in FIG. 1. The process in FIG. 9 is implemented by the arithmetic processing unit 401 of the server 102 executing a program loaded from the storage device 403 to the volatile memory 402.

Referring to FIG. 9, upon receiving a circuit board replacement completion notification from the communication terminal 103 (YES in the step S901), the arithmetic processing unit 401 overwrites a value of the total cumulative communication data size 805 corresponding to identification information included in the circuit board replacement completion notification in the operating rate management file 800 with 0 (zero) (step S902). After that, the data size reset process is ended.

According to the first embodiment described above, the lifetime of the arithmetic processing unit 201 in the image forming apparatus 101a is predicted based on the communication data size information received from the image forming apparatus 101a. Namely, the lifetime of the arithmetic processing unit 201 in the image forming apparatus 101a is predicted based on a size of communication data of reading and writing of data from and to the nonvolatile memory 202 by the arithmetic processing unit 201. As a result, the lifetime of the arithmetic processing unit 201, which carries out communications related to reading and writing of data with the nonvolatile memory 202, is accurately predicted.

Moreover, in the first embodiment described above, the arithmetic processing unit 201 performs the clock gating control. In the clock gating control, as described above, the operating rate of the clock signal A output from the image forming apparatus 101a depends on a size of data read from and written to the nonvolatile memory 202 by the arithmetic processing unit 201. By using the operating rate of the clock signal A determined based on this data size, an operating state of the arithmetic processing unit 201 can be kept track of to accurately predict the lifetime of the arithmetic processing unit 201.

Furthermore, in the first embodiment described above, the nonvolatile memory 202 is an eMMC, and hence the lifetime of a semiconductor device, which carries out communications related to reading and writing of data with the eMMC, is accurately predicted.

In the first embodiment described above, at startup of the image forming apparatus 101a, the image forming apparatus 101a sends the communication data size information during the previous operation of the image forming apparatus 101a to the server 102. As a result, whenever the image forming apparatus 101a is started, the lifetime of the arithmetic processing unit 201 in the image forming apparatus 101a is accurately predicted with consideration given to a previous operating state.

In the first embodiment described above, the server 102 monitors the lifetimes of respective arithmetic processing units 201 of a plurality of image forming apparatuses such as the image forming apparatus 101a and the image forming apparatus 101b. As a result, in a user environment in which the plurality of image forming apparatuses is installed, the lifetime of the arithmetic processing unit 201 in each image forming apparatus is accurately predicted.

It should be noted that the present invention is not limited to the embodiment described above. For example, the process in the step S703 may be carried out by the image forming apparatus 101a, and communication data size information including each data size calculated by the image forming apparatus 101a may be sent to the server 102.

Moreover, in the first embodiment described above, a plurality of nonvolatile memories 202 may be connected to the PHY 215. In this arrangement, a value obtained by totaling sizes of data read from and written to those nonvolatile memories 202 connected to the PHY 215 is set as the total cumulative communication data size 805 in the operating rate management file 800.

A description will now be given of an image forming apparatus and a control method therefor according to a second embodiment of the present invention.

The second embodiment is basically the same as the first embodiment described above in terms of its arrangement and effects, and differs from the first embodiment described above in that in the second embodiment, the image forming apparatus 101a predicts the lifetime of the arithmetic processing unit 201. Therefore, description of arrangements and effects corresponding to those in the first embodiment is omitted, and hence a description will be given below only of arrangements and effects different from those in the first embodiment.

Figure 10:
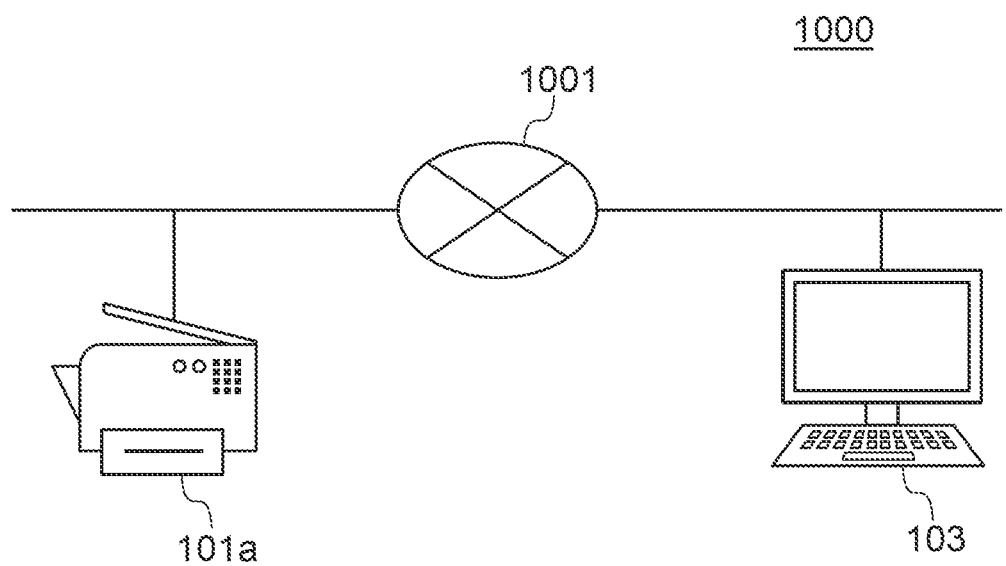
FIG. 10 is a view schematically showing an arrangement of an information processing system according to a second embodiment of the present invention.

FIG. 10 is a view schematically showing an arrangement of an information processing system 1000 according to the second embodiment. Referring to FIG. 10, the information processing system 1000 has the image forming apparatus 101a and the communication terminal 103. It should be noted that in the present embodiment, the arrangement of the information processing system 1000 shown in FIG. 10 is just one example, and the information processing system 1000 may have a plurality of image forming apparatuses and may have a plurality of communication terminals. The image forming apparatus 101a is connected to the communication terminal 103 via a network 1001. The network 1001 is a WAN or LAN as with the network 104 and the network 105 described above. In the network 1001, for example, TCP/IP is used as a communication protocol.

In the information processing system 1000 that does not include the server 102, the arithmetic processing unit 201 of the image forming apparatus 101a carries out processes corresponding to the lifetime prediction process and the data size reset process described above. Moreover, in the information processing system 1000, an operating rate management file is stored in the nonvolatile memory 202 of the image forming apparatus 101a. It should be noted that in the information processing system 1000, there is no need for centralized management of information about a plurality of image forming apparatuses, as is distinct from the server 102, because the image forming apparatus 101a predicts the lifetime of its own the arithmetic processing unit 201. For this reason, the operating rage management file stored in the nonvolatile memory 202 includes only values, related to the image forming apparatus 101a, of the product serial number 801, the reception date and time 802, the total read data size 803, the total written data size 804, the total cumulative communication data size 805, and the notification sending date and time 806.

Figure 11:
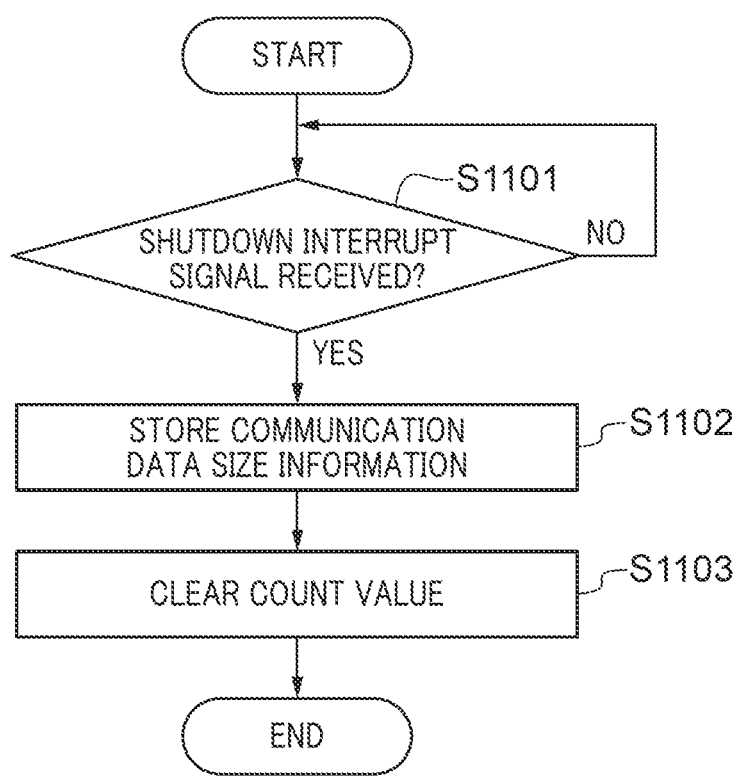
FIG. 11 is a flowchart showing the procedure of a communication data size information storage process that is carried out by an image forming apparatus in the information processing system in FIG. 10.

FIG. 11 is a flowchart showing the procedure of a communication data size information storage process that is carried out by the image forming apparatus 101a in the information processing system 1000 in FIG. 10. The process in FIG. 11 is implemented by the arithmetic processing unit 201 executing a program loaded from the nonvolatile memory 202 to the volatile memory 203. As with the communication data size information storage process in FIG. 5, the process in FIG. 11 is carried out when the arithmetic processing unit 201 has received the shutdown interrupt signal mentioned above.

Referring to FIG. 11, the arithmetic processing unit 201 stands by until it receives the shutdown interrupt signal (step S1101). Upon receiving the shutdown interrupt signal (YES in the step S1101), the arithmetic processing unit 201 stores the communication data size information mentioned above in the nonvolatile memory 202 (step S1102). Then, the arithmetic processing unit 201 causes the communication data size counter 214 to stop counting, clears a count value indicating a result of counting by the communication data size counter 214 (step S1103) to end the communication data size information storage process.

Figure 12:
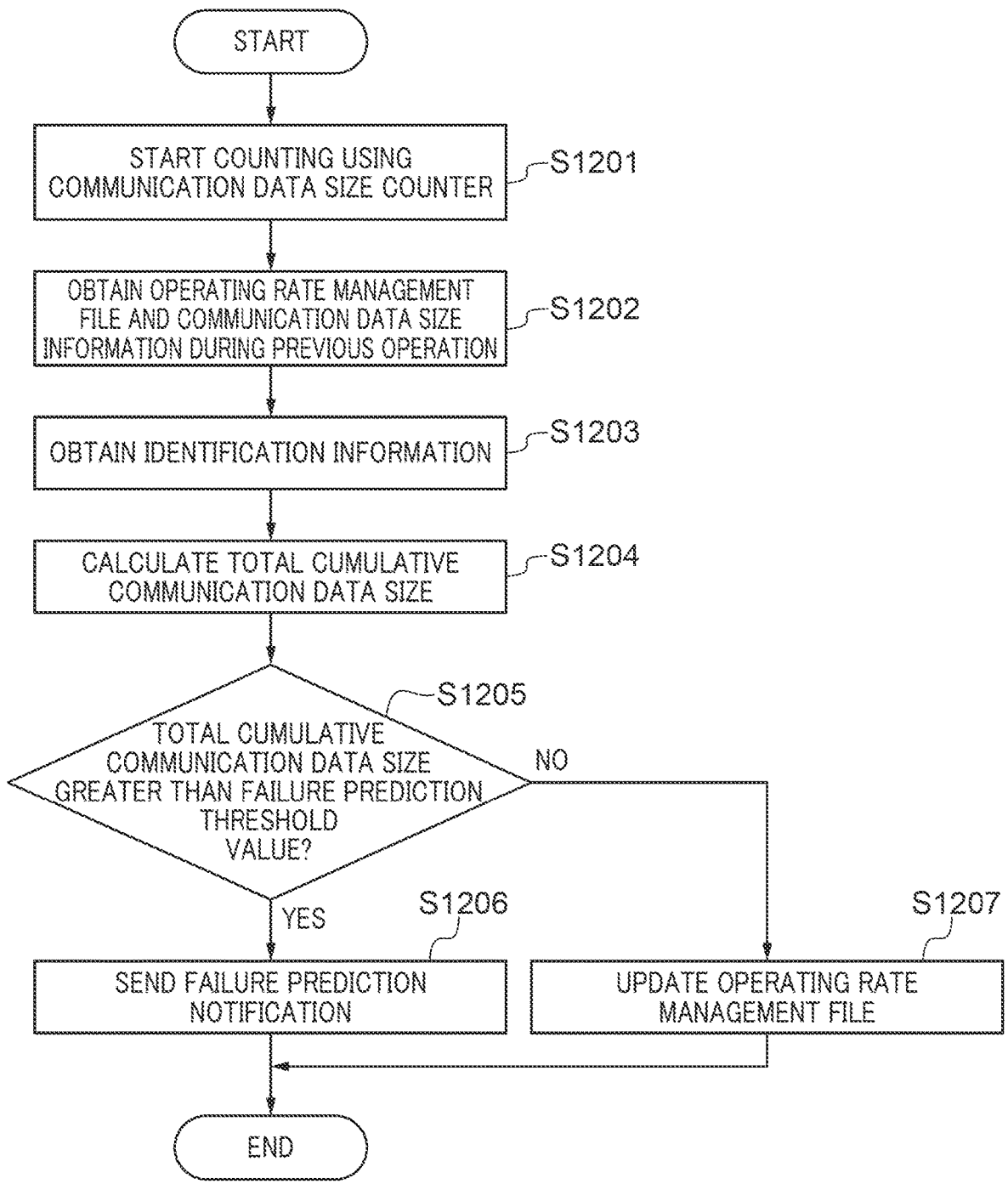
FIG. 12 is a flowchart showing the procedure of a lifetime prediction process that is carried out by the image forming apparatus in the information processing system in FIG. 10.

FIG. 12 is a flowchart showing the procedure of a lifetime prediction process that is carried out by the image forming apparatus 101a in the information processing system 1000 in FIG. 10. The process in FIG. 12 is implemented by the arithmetic processing unit 201 executing a program loaded from the nonvolatile memory 202 to the volatile memory 203. As with the communication data size information sending process in FIG. 6, the lifetime prediction process in FIG. 12 is carried out when the power is started to be supplied to the arithmetic processing unit 201 and the arithmetic processing unit 201 ended an initialization process for the eMMC driver (not shown), which controls the nonvolatile memory 202, and an initialization process for the file system (not shown). It is assumed that in the lifetime prediction process in FIG. 12, the operating rate management file described above is stored beforehand in the nonvolatile memory 202.

Referring to FIG. 12, the arithmetic processing unit 201 causes the communication data size counter 214 to start counting (step S1201). Next, the arithmetic processing unit 201 obtains the operating rate management file and the communication data size information during the previous operation from the nonvolatile memory 202 (step S1202). The communication data size information during the previous operation is the communication data size information stored in the nonvolatile memory 202 in the step S1102 described above. Then, the arithmetic processing unit 201 obtains the identification information about the image forming apparatus 101a from the nonvolatile memory 204 (step S1203). After that, the arithmetic processing unit 201 calculates, in a similar manner of step S703, a total cumulative communication data size based on the operating rate management file and the communication data size information during the previous operation obtained in the step S1202 (step S1204). The arithmetic processing unit 201 then determines whether or not the total cumulative communication data size calculated in the step S1204 is greater than the failure prediction threshold value mentioned above (step S1205).

As a result of the determination in the step S1205, when the total cumulative communication data size calculated in the step S1204 is greater than the failure prediction threshold value, the arithmetic processing unit 201 controls the communication control unit 205 to send the failure prediction notification mentioned above to the communication terminal 103 (step S1206). After that, the lifetime prediction process is ended.

As a result of the determination in the step S1205, when the total cumulative communication data size calculated in the step S1204 is not greater than the failure prediction threshold value mentioned above, the arithmetic processing unit 201 updates the operating rate management file 800 using the total cumulative communication data size, the total read data size, and the total written data size calculated in the step S1204 (step S1207) as with the step S706. After that, the lifetime prediction process is ended.

Figure 13:
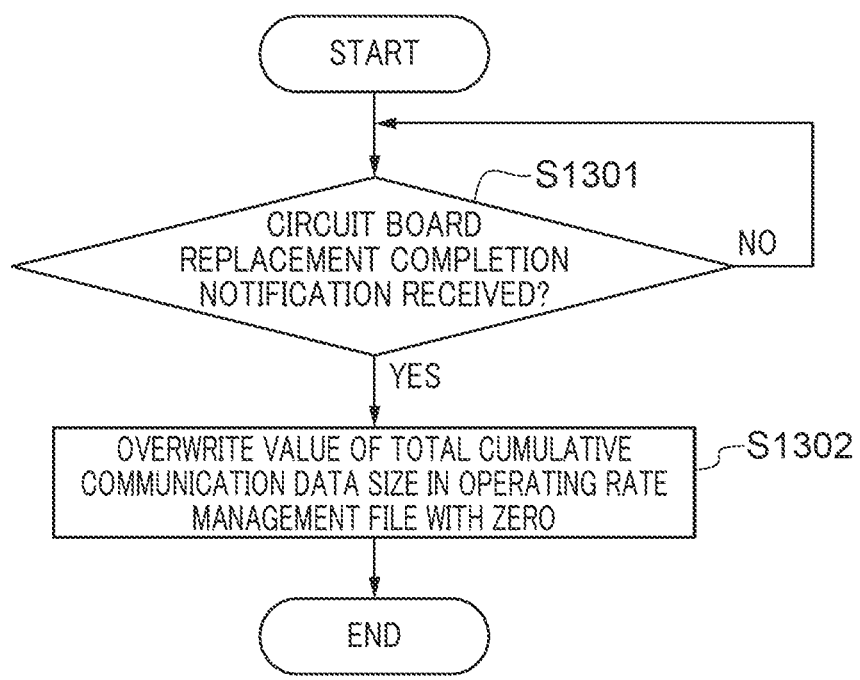
FIG. 13 is a flowchart showing the procedure of a data size reset process that is carried out by the image forming apparatus in the information processing system in FIG. 10.

FIG. 13 is a flowchart showing the procedure of a data size reset process that is carried out by the image forming apparatus 101a in the information processing system 1000 in FIG. 10. The process in FIG. 13 is implemented by the arithmetic processing unit 201 executing a program loaded from the nonvolatile memory 202 to the volatile memory 203.

Referring to FIG. 13, upon receiving a circuit board replacement completion notification from the communication terminal 103 (YES in step S1301), the arithmetic processing unit 201 overwrite a value of the total cumulative communication data size, which corresponds to identification information included in the circuit board replacement completion notification in the operating rate management file 800, with 0 (zero) (step S1302). After that, the data size reset process is ended.

In the second embodiment described above, the image forming apparatus 101a predicts the lifetime of the arithmetic processing unit 201 in the image forming apparatus 101a based on the calculated total cumulative communication data size. As a result, the lifetime of the arithmetic processing unit 201 in the image forming apparatus 101a is accurately predicted without a server that monitors the lifetime of the arithmetic processing unit 201 in the image forming apparatus 101a.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-098846, filed Jun. 5, 2020, which is hereby incorporated by reference herein in its entirety.

What is claimed is:

1. An information processing system comprising:
an image forming apparatus having a nonvolatile memory and a first controller configured to control reading and writing of data from and to the nonvolatile memory; and
a server having a network interface and a second controller, the server being configured to monitor a lifetime of the first controller in the image forming apparatus,
wherein the first controller of the image forming apparatus is configured to generate information indicating a communication data size of reading of data, or writing of data, or both reading and writing of data, from and to the nonvolatile memory,
wherein the network interface of the server is configured to receive the generated information from the first controller of the image forming apparatus, and
wherein the second controller of the server is configured to predict a lifetime of the first controller of the image forming apparatus based on a cumulative communication data size calculated from the received information indicating the communication data size.

2. The information processing system according to claim 1, wherein the first controller is configured to output a clock signal for use in reading and/or writing of the data to the nonvolatile memory, and stop generating the clock signal during a time period over which the data is not read and/or written.

3. The information processing system according to claim 1, wherein the nonvolatile memory is an embedded Multi-Media Card (eMMC).

4. The information processing system according to claim 1, wherein, at startup of the image forming apparatus, the image forming apparatus is configured to send the server the information indicating the communication data size of reading and writing of the data from and to the nonvolatile memory performed while the image forming apparatus was operating last time.

5. The information processing system according to claim 1, wherein the server is configured to monitor the lifetime of the first controller in each of a plurality of image forming apparatuses.

6. The information processing system according to claim 1,
wherein the server has a storage configured to store the cumulative communication data size for the image forming apparatus, and
wherein, when receiving information, from the first controller, indicating the communication data size of reading of data, or writing of data, or both reading and writing of data from and to the nonvolatile memory performed while the image forming apparatus was operating the last time, the server is configured to:
obtain a second cumulative communication data size calculated one time previously, from the storage; and
calculate a new cumulative communication data size by adding the communication data size during a last operation of the image forming apparatus indicated by the received information to the obtained second cumulative communication data size calculated one time previously.

7. The information processing system according to claim 6,
wherein the server is configured to receive identification information uniquely assigned to the image forming apparatus together with the information indicating the communication data size, and
wherein the server is configured to obtain, based on the identification information assigned to a specific image forming apparatus, the cumulative communication data size calculated one time previously for the specific image forming apparatus, and calculate the new cumulative communication data size for the specific image forming apparatus.

8. The information processing system according to claim 1,
wherein the second controller is configured to predict the lifetime of the first controller based on whether the calculated cumulative communication data size is greater than a threshold value, and
wherein, in a case where the calculated cumulative communication data size is greater than the threshold value, the second controller is configured to determine that the lifetime of the first controller is close to the end.

9. The information processing system according to claim 8,
wherein the threshold value is a data size that is set in consideration of a predetermined margin allowed for a limit of data size of reading and writing of data from and to the nonvolatile memory.

10. The information processing system according to claim 1,
wherein the image forming apparatus has a communication controller configured to output Page Description Language (PDL) data to the first controller, and
wherein the data includes received image data.

11. An image forming apparatus comprising:
a nonvolatile memory; and
a controller configured to:
control reading and writing of data from and to the nonvolatile memory;
calculate a total cumulative communication data size of reading of data, or writing of data, or both reading and writing of data from and to the nonvolatile memory; and
predict a lifetime of the controller of the image forming apparatus based on the calculated total cumulative communication data size.

12. The image forming apparatus according to claim 11, wherein the controller is configured to output a clock signal for use in reading and/or writing of the data to the nonvolatile memory, and stop generating the clock signal during a time period over which the data is not read and/or written.

13. The image forming apparatus according to claim 11, wherein the nonvolatile memory is an embedded MultiMedia Card (eMMC).

14. The image forming apparatus according to claim 11, wherein, at startup of the image forming apparatus, the controller is configured to calculate a total cumulative communication data size of reading and writing of the data from and to the nonvolatile memory.

15. The image forming apparatus according to claim 11, wherein the controller is configured to:
obtain, from the nonvolatile memory, information indicating a first communication data size of reading of data, or writing of data, or both reading and writing of data from and to the nonvolatile memory performed while the image forming apparatus was operating the last time, and a second cumulative communication data size calculated one time previously; and
calculate a new cumulative communication data size by adding the first communication data size during the last operation of the image forming apparatus indicated by the obtained information to the obtained second cumulative communication data size calculated one time previously.

16. The image forming apparatus according to claim 11, wherein the controller is configured to count the communication data size using a counter.

17. The image forming apparatus according to claim 11,
wherein the controller is configured to predict the lifetime of the controller based on whether the calculated cumulative communication data size is greater than a threshold value, and
wherein, in a case where the calculated cumulative communication data size is greater than the threshold value, the controller is configured to determine that the lifetime of the controller is close to the end.

18. The image forming apparatus according to claim 17, wherein the threshold value is a data size that is set in consideration of a predetermined margin allowed for a limit of data size of reading and writing of data from and to the nonvolatile memory.

19. The image forming apparatus according to claim 11,
wherein a communication controller configured to output received Page Description Language (PDL) data to the controller, and
wherein the data includes received image data.

20. A control method for an information processing system comprising an image forming apparatus and a server, wherein the image forming apparatus has a nonvolatile memory and a first controller configured to control reading and writing of data from and to the nonvolatile memory, and wherein the server has a network interface and a second controller, the server being configured to monitor a lifetime of the first controller in the image forming apparatus, the control method comprising:
causing the first controller of the image forming apparatus to generate information indicating a communication data size of reading of data, or writing of data, or both reading and writing of data, from and to the nonvolatile memory,
causing the network interface of the server to receive the generated information from the first controller of the image forming apparatus; and
causing the second controller of the server to predict a lifetime of the controller of the image forming apparatus based on a cumulative communication data size calculated from the received information indicating the communication data size.

21. A control method for an image forming apparatus having a nonvolatile memory and a controller, the control method comprising:
controlling reading and writing of data from and to the nonvolatile memory;
calculating a total cumulative communication data size of reading of data, or writing of data, or both reading and writing of data from and to the nonvolatile memory; and predicting a lifetime of the controller of the image forming apparatus based on the calculated total cumulative communication data size.

\* \* \* \* \*